UNITED STATES PATENT OFFICE.

JOHN LORENZ, OF MUSKEGON, MICHIGAN.

COMPOSITION FOR ARTIFICIAL STONE, &c.

SPECIFICATION forming part of Letters Patent No. 366,012, dated July 5, 1887.

Application filed January 3, 1887. Serial No. 223,317. (No specimens.)

*To all whom it may concern:*

Be it known that I, JOHN LORENZ, of the city and county of Muskegon, in the State of Michigan, have invented a new and useful Composition Forming an Artificial Stone to be used in the construction of walls, paving, and all other purposes in which an artificial stone is applicable.

The nature of my invention consists in a proper combination of ashes and cinders or clinkers with ordinary cement to form a perfect and durable artificial stone for the purpose above specified. A material has been used for these purposes composed of clear ashes and cement, and also of clear cinders and cement, as well as these materials combined with lime or adhesive substances; but so far as my knowledge extends no one but myself has yet used the compound formed of ashes and cinders with cement.

Experience has shown that artificial stone made of ashes and cement is susceptible to the action of the elements to such a degree as to cause it to soften, scale, crack, and easily wear out; and, further, artificial stone made from cinders and cement has been found to be too gritty for many of the purposes hereinbefore set forth, is liable to become rough by use, and requires a very large amount of cement in its formation, and consequently is more expensive than stone constructed by a combination of ashes with cinders and cement. By experiment I have demonstrated that this combination produces a stone which will not be injuriously affected by heat, water, or frost, and is therefore free from cracking, crumbling, scaling, or softening, and can be dressed and polished to such an extent as may be required.

To enable others skilled in the art to make and use my invention, I will proceed to describe its construction.

I take five parts of ashes and mix therewith one part of cement, then add thereto four parts of coal cinders or clinkers. If a very fine stone is desired, crush the cinders before mixing; but for the purpose of arching, walling, paving, &c., it will not be necessary to crush the cinders. A hard and almost impervious stone will be thus formed, which can be polished, if desired. These proportions may be slightly varied, and substantially the same durability, hardness, and imperviousness can be obtained by increasing the amount of ashes and cinders without increasing the amount of cement—as, for instance, using fifteen or more parts of ashes and cinders to one part of cement.

I am aware of the patents to Baldwin, Jones and Gibbs, bearing date February 12, 1867, and that of B. Lande, June 3, 1884, and hereby disclaim as being my invention the composition for making artificial stone described in either of said patents.

Having thus described my invention, I claim as new, and desire to secure by Letters Patent, the following:

As an improvement in artificial stone, the compound formed from a mixture of five parts ashes, four parts cinders, and one part cement, united in the manner substantially as hereinbefore set forth.

Muskegon, Michigan, December 23, A. D. 1886.

JOHN LORENZ.

In presence of—
 LEVI BEARDSLEY,
 JAMES O'HARA.